`US010303184B1`

United States Patent
Cutler et al.

(10) Patent No.: US 10,303,184 B1
(45) Date of Patent: May 28, 2019

(54) AUTONOMOUS TAKEOFF AND LANDING WITH OPEN LOOP MODE AND CLOSED LOOP MODE

(71) Applicant: Kitty Hawk Corporation, Mountain View, CA (US)

(72) Inventors: Mark Johnson Cutler, Sunnyvale, CA (US); Alexander David Selwa, Mountain View, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/848,847

(22) Filed: Dec. 20, 2017

Related U.S. Application Data

(60) Provisional application No. 62/596,445, filed on Dec. 8, 2017.

(51) Int. Cl.
| | | |
|---|---|---|
| *B64C 39/12* | (2006.01) | |
| *G05D 1/06* | (2006.01) | |
| *G05D 1/04* | (2006.01) | |
| *B64C 29/00* | (2006.01) | |
| *G05D 1/00* | (2006.01) | |

(52) U.S. Cl.
CPC ....... *G05D 1/0669* (2013.01); *B64C 29/0016* (2013.01); *G05D 1/0088* (2013.01); *G05D 1/042* (2013.01); *G05D 1/0676* (2013.01)

(58) Field of Classification Search
CPC ............ B64C 39/024; B64C 2201/141; B64C 2201/024; B64C 2201/027; B64C 2201/128; G01C 21/16; G01C 21/165; G05C 1/0808; G05C 1/0816; G05C 1/0858

USPC ....... 701/3, 4, 5, 6, 7, 8, 10; 244/17.13, 180
See application file for complete search history.

(56) References Cited

U.S. PATENT DOCUMENTS

| | | | | |
|---|---|---|---|---|
| 3,678,256 | A * | 7/1972 | Harenberg, Jr. ...... | G05D 1/0077 244/195 |
| 4,821,981 | A * | 4/1989 | Gangsaas ................ | B64C 13/16 244/191 |
| 4,953,098 | A * | 8/1990 | Fischer, Jr. ........... | B64C 27/325 244/17.11 |
| 6,122,572 | A * | 9/2000 | Yavnai ................. | G05D 1/0088 342/13 |
| 6,539,290 | B1 * | 3/2003 | Vos ......................... | G05B 9/02 244/181 |
| 8,458,715 | B1 * | 6/2013 | Khosla ..................... | G06F 9/50 702/104 |
| 9,643,722 | B1 * | 5/2017 | Myslinski ............. | B64C 39/024 |

(Continued)

*Primary Examiner* — Richard A Goldman
(74) *Attorney, Agent, or Firm* — Van Pelt, Yi & James LLP

(57) ABSTRACT

Autonomous flight is performed in an open loop mode over a first range of altitudes, wherein a plurality altitude-related data from a plurality of altitude-related sensors is ignored while performing the autonomous flight in the open loop mode. The autonomous flight is performed in a closed loop mode over a second range of altitudes, wherein: the plurality of altitude-related data from the plurality of altitude-related sensors is used while performing the autonomous flight in the closed loop mode, and the first range of altitudes is a non-overlapping, lower range of altitudes compared to the second range of altitudes. The altitude-related data may include, among other things, a radar signal or a phase associated with a radar signal.

21 Claims, 13 Drawing Sheets

(56) References Cited

U.S. PATENT DOCUMENTS

| | | | |
|---|---|---|---|
| 2004/0093130 A1* | 5/2004 | Osder | B64C 27/18 701/3 |
| 2005/0134496 A1* | 6/2005 | Trainor | B64D 5/00 342/14 |
| 2005/0231422 A1* | 10/2005 | Etnyre | G01S 13/9303 342/182 |
| 2007/0032921 A1* | 2/2007 | Allen | G01C 23/005 701/3 |
| 2011/0046823 A1* | 2/2011 | Ezerzere | G05D 1/0816 701/4 |
| 2011/0084162 A1* | 4/2011 | Goossen | B64C 39/024 244/12.1 |
| 2012/0298796 A1* | 11/2012 | Carreker | B64G 1/22 244/100 R |
| 2013/0046422 A1* | 2/2013 | Cabos | G08G 5/0034 701/3 |
| 2014/0018980 A1* | 1/2014 | Bollapragada | G08G 5/0021 701/10 |
| 2015/0012154 A1* | 1/2015 | Senkel | B64D 17/80 701/4 |
| 2016/0062364 A1* | 3/2016 | Foinet | A63H 27/14 701/2 |
| 2016/0140729 A1* | 5/2016 | Soatto | G01S 5/16 348/135 |
| 2016/0335898 A1* | 11/2016 | Caplan | G08G 5/006 |
| 2017/0076616 A1* | 3/2017 | Kanade | G08G 5/045 |
| 2017/0357808 A1* | 12/2017 | Arroyo | G06F 21/57 |

\* cited by examiner

Pilot-Guided Flight

AUTONOMOUS TAKEOFF AND LANDING WITH OPEN LOOP MODE AND CLOSED LOOP MODE

CROSS REFERENCE TO OTHER APPLICATIONS

This application claims priority to U.S. Provisional Patent Application No. 62/596,445 entitled AUTONOMOUS TAKEOFF AND LANDING WITH OPEN LOOP MODE AND CLOSED LOOP MODE filed Dec. 8, 2017 which is incorporated herein by reference for all purposes.

BACKGROUND OF THE INVENTION

When performing autonomous takeoff and/or landing, an important piece of information is the altitude of the aircraft. Some types of altitude sensors, such as sensors which use radar to measure altitude, have a "dead zone" near the ground where the sensors produce unreliable, inaccurate, and/or erroneous altitude measurements. To compensate for this, some autonomous takeoff and/or landing systems use two types of altitude sensors: one for altitude measurements at lower altitudes and another for altitude measurements at higher altitudes. This adds to the weight and cost of the aircraft, which is undesirable. New techniques for performing autonomous takeoff and/or landing that can accommodate an altitude-measurement dead zone and which are lighter and/or less expensive would be desirable.

BRIEF DESCRIPTION OF THE DRAWINGS

Various embodiments of the invention are disclosed in the following detailed description and the accompanying drawings.

BRIEF SUMMARY OF THE DISCLOSURE

Figure 1:
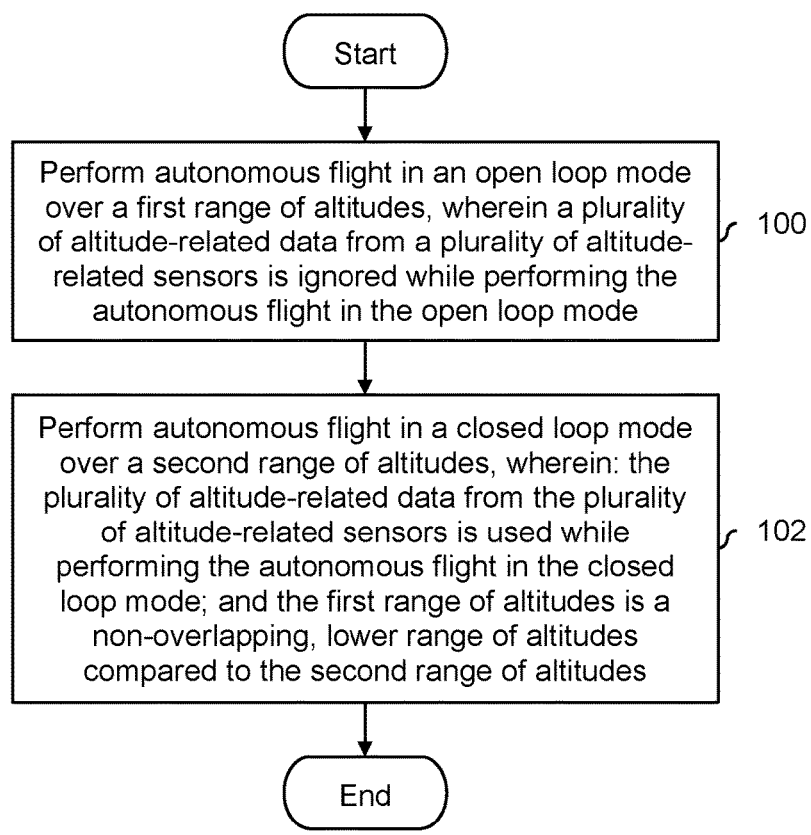
FIG. 1 is a flowchart illustrating an embodiment of a process to perform autonomous flight.

Autonomous flight techniques, including landing and takeoff, are disclosed. Measurements made by altitude sensors can be passed on to a controller in one mode of operation, and prevented from being passed to the controller in another mode of operation (e.g., when the sensors are expected to be unreliable or erroneous). In an open loop mode of operation (over a first range of altitudes), a plurality of altitude-related data from a plurality of altitude-related sensors is ignored. In a closed loop mode of operation (over a second range of altitudes), the plurality of altitude-related data from the plurality of altitude-related sensors is used. The first range of altitudes is a non-overlapping, lower range of altitudes compared to the second range of altitudes. In one aspect, this allows a single type of altitude sensor to be provided in an aircraft instead of needing multiple types of sensors, which reduces the weight and cost of the aircraft.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to perform autonomous flight (e.g., an autonomous takeoff or an autonomous landing) are described herein. First, an embodiment of an autonomous flight process which operates in an open loop mode and a closed loop mode over a first range of altitudes and a second range of altitudes, respectively, is described. As will be described in more detail below, this technique ignores altitude-related data during a dead zone (and possibly some margin above that) and incorporates or otherwise uses the altitude-related data when (e.g., safely) outside of the dead zone.

FIG. 1 is a flowchart illustrating an embodiment of a process to perform autonomous flight. In one example, the process is performed by a (ultra) lightweight, single-seat multicopter which autonomous takes off and lands vertically. For example, the autonomous takeoffs and landings may make flying such a multicopter safer and/or enable novice pilots with little or no conventional flight training on conventional aircraft to fly the multicopter. In some embodiments, such a multicopter is capable of taking off from and/or landing on variety of surfaces (e.g., water as well as land, as desired).

At 100, autonomous flight is performed in an open loop mode over a first range of altitudes, wherein a plurality of altitude-related data from a plurality of altitude-related sensors is ignored while performing the autonomous flight in the open loop mode. As used herein, the term "altitude-related data" may include altitude values themselves or signals or values from which altitudes are subsequently determined (e.g., if the altitude measurement technique is radar based, the altitude-related data may be the received radar signal or some value or property related to it (e.g., a phase associated with the received radar signal)).

In open loop mode, instead of using the altitude-related data (or, more generally, measured data or a measured signal) to adjust some desired value or desired signal using a feedback loop, the desired value or desired signal is passed directly to the control surfaces (e.g., rotors in a multicopter) without adjustment or modification based on the measured data (i.e., the altitude-related data).

Operating in an open loop mode at step 100 is to address the unreliable and/or erroneous nature of the altitude-related data at lower altitudes. At lower altitudes, some types of altitude-related sensors are unreliable and/or report incorrect altitudes. For convenience and brevity, this region or airspace associated with unreliable and/or incorrect altitudes is sometimes referred to herein as a dead zone. To deal with the unreliable and/or incorrect altitude-related data in the dead zone, the potentially incorrect altitude-related data is ignored at step 100, specifically by performing autonomous flight in an open loop mode (e.g., where the altitude-related data is not used in a feedback loop). In some embodiments, the autonomous flight which is performed at step 100 is an autonomous takeoff. Alternatively, the autonomous flight at step 100 may be an autonomous landing.

At 102, autonomous flight is performed in a closed loop mode over a second range of altitudes, wherein: the plurality of altitude-related data from the plurality of altitude-related sensors is used while performing the autonomous flight in the closed loop mode; and the first range of altitudes is a non-overlapping, lower range of altitudes compared to the second range of altitudes.

In some embodiments, depending upon whether the aircraft is performing an autonomous takeoff or landing, different techniques are used to switch between the open loop mode in step 100 and the closed loop mode in step 102. In some embodiments, if an autonomous takeoff is being performed (e.g., where step 100 occurs first and then step 102 is subsequently performed), the altitude-related data and/or some related metadata (e.g., a reliability or confidence value) is/are analyzed to determine when the altitude-related data may be trusted and thus the system can switch to the closed loop mode in step 102. Alternatively, if an autonomous landing is being performed (e.g., where step 102 occurs first and then step 100 occurs), in some embodiments the switch between the two modes occurs once a certain altitude threshold is reached (e.g., which is safely above the dead zone).

To deal with the dead zone, some other types of autonomous flight systems use two types of sensors: one for lower altitudes and one for higher altitudes. Naturally, this adds weight to the aircraft since two types of sensors are included. For (ultra) lightweight aircraft, the additional weight is very unattractive. In contrast, the technique described herein is much lighter since a new (e.g., dead zone) altitude measuring system does not need to be added.

The following figure shows an example of how the altitude-related data is ignored and used while in the open loop mode and closed loop mode, respectively.

Figure 2A:
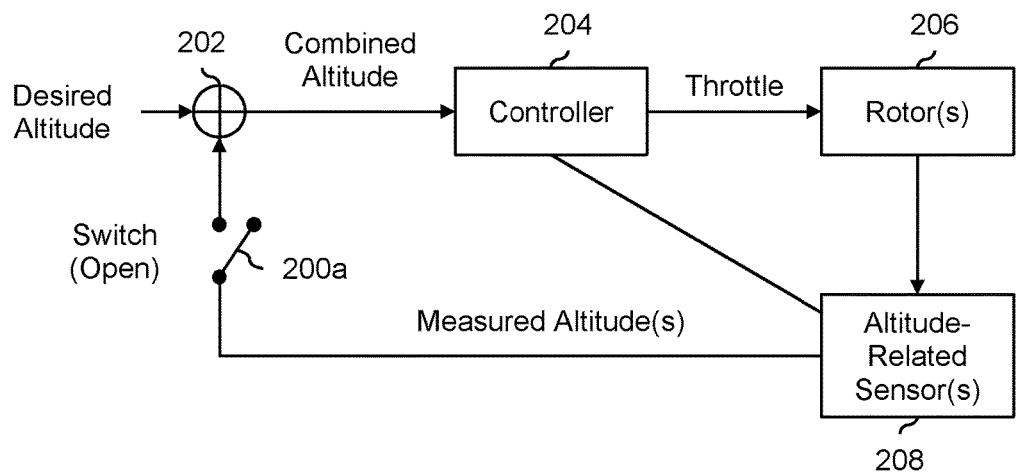
FIG. 2A is a block diagram illustrating an embodiment of a feedback loop in an open loop mode.

FIG. 2A is a block diagram illustrating an embodiment of a feedback loop in an open loop mode. In the example shown, a feedback loop is shown where a switch (200a) in the feedback loop is open and thus the system is operating in an open loop mode. The open switch (200a) prevents one or more measured altitudes (which at low altitudes are unreliable and/or erroneous) from being passed to an adder (202). With the switch open, the combined altitude (which is output by adder 202) equals the desired altitude. The desired altitude may reflect some autonomous takeoff or landing sequence (e.g., where the vertical velocity of the aircraft is neither too slow so that the pilot becomes impatient or so fast that the takeoff or landing is dangerous and/or uncomfortable). In one example, an autonomous takeoff or landing sequence is represented as a sequence of desired altitudes at various points in time.

The combined altitude is passed to a controller (204) which in this example (for simplicity and ease of explanation) converts the combined altitude into a corresponding throttle value. For example, the throttle value may correspond to a torque value or a rotations per minute (RPM) value.

The throttle value is passed to one or more rotors (206) (e.g., which are part of a multicopter). The rotors cause a change in the aircraft's state (e.g., the aircraft's in-air position, including altitude) and those changes are measured by the altitude-related sensors (208) which output one or measured altitudes. For simplicity and convenience, the output of the sensors is simply referred to as "altitudes" but more generally may be any type of altitude-related data. As described above, since the aircraft is at relatively low altitudes where there is low confidence in the measured altitude(s), the open switch (200a) prevents that unreliable and/or erroneous information from being used by the rest of the system.

Figure 2B:
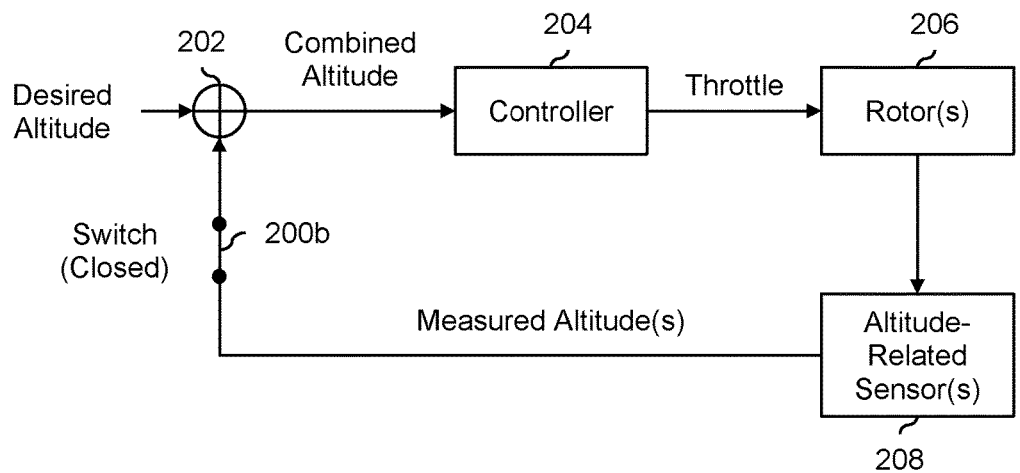
FIG. 2B is a block diagram illustrating an embodiment of a feedback loop in a closed loop mode.

FIG. 2B is a block diagram illustrating an embodiment of a feedback loop in a closed loop mode. In this state, the switch (200b) is closed such that the feedback loop is operating in a closed loop mode. At higher altitudes (which is when the switch is closed), the measured altitude(s) are accurate and/or reliable and therefore that information can be used in the feedback loop.

Referring back to FIG. 1, FIG. 2A shows one example of performing autonomous flight in an open loop mode at step 100 and FIG. 2B shows an example of performing autonomous flight in a closed loop mode at step 102. Naturally, other techniques for configuring a system to be in open loop mode versus closed loop mode may be used.

The following figure shows one example of an aircraft which uses the autonomous flight technique shown in FIG. 1 to take off and/or land.

Figure 3:
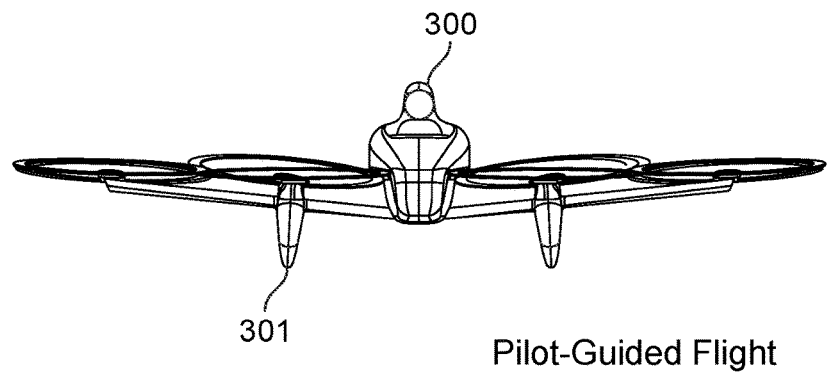
FIG. 3 is a diagram illustrating an embodiment of a multicopter which takes off and lands autonomously.
Figure 3:
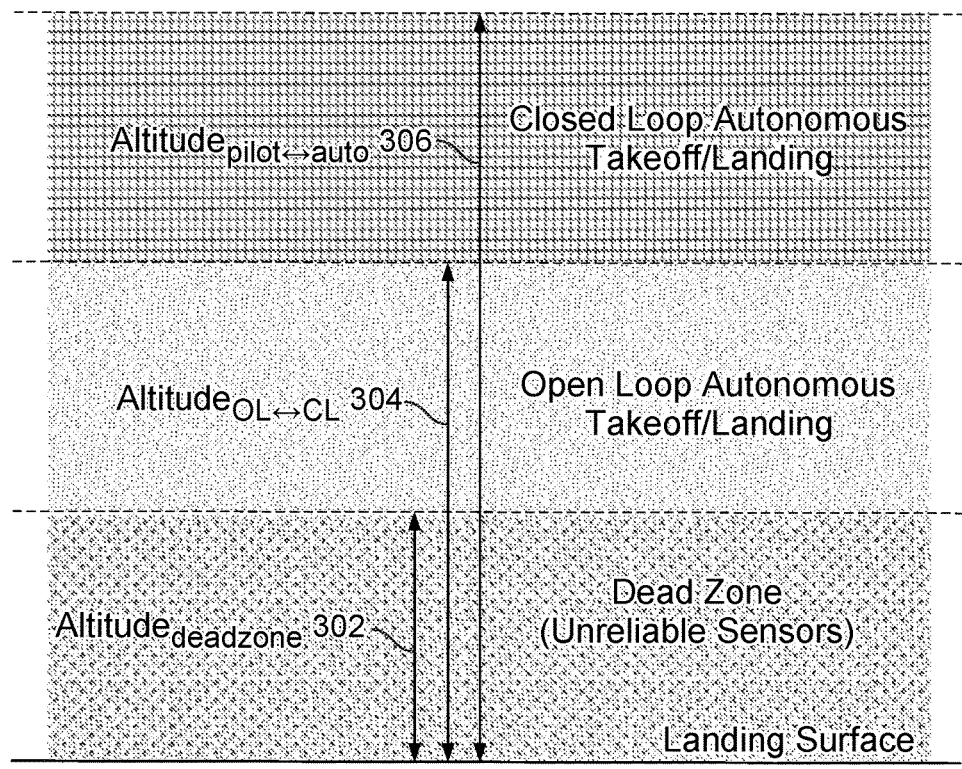

FIG. 3 is a diagram illustrating an embodiment of a multicopter which takes off and lands autonomously. In the example shown, multicopter 300 has ten rotors: five rotors on the left (port) side and five rotors on the right (starboard) side. Six inner rotors (not shown) are located adjacent to the fuselage. Four outer rotors (not shown) are separated from the fuselage by the inner rotors. This type of rotor arrangement is sometimes referred to as a wide span rotor configuration. In this example, multicopter 300 weighs on the order of 250 pounds and may qualify as an ultralight aircraft under federal aviation regulation guidelines. The orientation of the rotors permits vertical takeoff and landing (VTOL) and the floats (301) on the aircraft permit water takeoffs and landings, if desired. The floats are sufficiently reinforced so that the multicopter can alternatively land on the ground, if desired.

One benefit to using such a multicopter is that it has a relatively high disc area (e.g., relative to the overall size). The relatively high disc area, combined with the relatively light weight of the multicopter, makes the multicopter more forgiving and/or tolerant when autonomously flying, in particular, during open loop mode at step 100 in FIG. 1. For example, suppose that multicopter 300 is autonomously landing per the process of FIG. 1. When multicopter 300 gets close to the ground (e.g., on the order of 10 feet or less), the ground effect (e.g., where the landing surface reflects the airflow from the rotors back upwards) helps to keep the multicopter airborne. If the open loop autonomous flight during step 100 were providing slightly inadequate lift, the ground effect (e.g., which is positively affected by the high disc area), combined with the relatively low weight of the multicopter, means that a hard landing or a crash will most likely be avoided. In contrast, with a heavier aircraft and/or one with a lower disc area, performing open loop autonomous flight is more difficult because the weight and disc area of the aircraft are less forgiving.

The dead zone is shown here as a dotted region corresponding to altitudes less than or equal to $altitude_{deadzone}$ (302). In this region, the altitude-related sensors are unreliable and the altitude-related data which is produced cannot be trusted. To handle this, when the multicopter is at an altitude below $altitude_{OL \leftrightarrow CL}$ (304), shown here as a shaded region, the multicopter will perform autonomous takeoffs and/or landings in an open loop mode (e.g., where the altitude-related data is ignored). See, for example, step 100 in FIG. 1.

When the multicopter is at an altitude between $altitude_{OL \leftrightarrow CL}$ (304) and $altitude_{pilot \leftrightarrow auto}$ (306), shown here with a grid pattern, the multicopter operates in a closed loop mode (e.g. where the altitude-related data is used). This corresponds to the closed loop mode at step 102 in FIG. 1 where the altitude-related data can be trusted and is therefore used. Various techniques for detecting when to switch between open loop mode and closed loop mode are described in more detail below.

At altitudes above $altitude_{pilot \leftrightarrow auto}$ (306), the aircraft operates in a pilot-guided flight mode. In other words, the autonomous flight system is turned off in favor of (at least partially) manual flight where the pilot guides the aircraft. For example, during an autonomous takeoff, multicopter 300 may ascend to some desired altitude, at which point the autonomous flight system is turned off and the multicopter hovers midair until the pilot starts guiding the multicopter using the joystick or some other input device. This is one example of $altitude_{pilot \leftrightarrow auto}$ (306). Or, an autonomous landing may be triggered by an instruction from the pilot to begin an autonomous landing procedure. The altitude of the multicopter at that point (e.g., when the autonomous landing instruction is issued) would then be $altitude_{pilot \leftrightarrow auto}$ (306).

Referring back to FIG. 1 briefly, step 100 and step 102 refer respectively to a first range of altitudes (e.g., associated with an open loop mode) and a second range of altitudes (e.g., associated with a closed loop mode). In this example, the first range of altitudes would be [0, $altitude_{OL \leftrightarrow CL}$] and the second range of altitudes would be [$altitude_{OL \leftrightarrow CL}$, $altitude_{pilot \leftrightarrow auto}$].

It is noted that the exemplary altitude ranges shown here are relatively simplistic for ease of explanation. As will be described in more detail below, in some embodiments, the altitude at which a switch is made between an open loop mode and a closed loop mode is not necessarily a predefined altitude or some altitude threshold, but rather at some point when one or more criteria (e.g., associated with ensuring that altitude-related data is reliable) have been satisfied.

In some embodiments, multicopter 300 has ten rotors with the following directions of rotation (where the rotor's position is relative to the pilot and the direction of rotation is when viewed from above).

TABLE 1

Example directions of rotation.

| Rotor | Direction of Rotation |
|---|---|
| Right Inner Front Rotor | Counterclockwise |
| Right Outer Front Rotor | Counterclockwise |
| Right Inner Middle Rotor | Clockwise |
| Right Outer Back Rotor | Clockwise |
| Right Inner Back Rotor | Counterclockwise |
| Left Inner Back Rotor | Clockwise |
| Left Outer Back Rotor | Counterclockwise |
| Left Inner Middle Rotor | Counterclockwise |
| Left Outer Front Rotor | Clockwise |
| Left Inner Front Rotor | Clockwise |

This alternation of rotational direction may enable the multicopter to fly more efficiently. A rotor creates lift when the blade is traveling against the direction of wind and does not create lift when it spins in the direction of wind. By stacking up alternating rotors one behind the next in the direction of flight (e.g., typically forwards), the multicopter may experience a consistent amount of lift and/or decrease intervals of decreased lift.

In some embodiments, the rotors of multicopter 300 are connected or otherwise mounted (e.g., to the rest of the multicopter) at the following roll angles and pitch angles. It is noted that opposite rotors (e.g., where the fuselage acts as an axis of symmetry) have roll angles of the same magnitude but opposite signs and the same pitch angle. Generally speaking, the roll angles and pitch angles have magnitudes within the range of 0 degrees and 10 degrees.

TABLE 2

Exemplary positions at which rotors are attached.

| Rotor | Roll Angle (in degrees) | Pitch Angle (in degrees) |
|---|---|---|
| Right Inner Front Rotor | 3.0 | 0.0 |
| Right Outer Front Rotor | −2.0 | −3.0 |
| Right Inner Middle Rotor | −4.0 | −9.0 |
| Right Outer Back Rotor | −2.0 | −10.0 |
| Right Inner Back Rotor | −7.0 | −2.0 |
| Left Inner Back Rotor | 7.0 | −2.0 |
| Left Outer Back Rotor | 2.0 | −10.0 |
| Left Inner Middle Rotor | 4.0 | −9.0 |
| Left Outer Front Rotor | 2.0 | −3.0 |
| Left Inner Front Rotor | −3.0 | 0.0 |

There are a number of benefits associated with the tilt positions shown in this example. First, all of the rotors have a slight (e.g., ~5 degrees) forward bias so that when the aircraft is flying forwards, the body of the aircraft remains level. Also, the tilt positions of the rotor angles are selected to maximize the aircraft's ability to yaw while minimizing the impact of losing any single rotor. The more a rotor is tilted, the more it contributes to yawing the vehicle when it is sped up or down.

The rotors are mounted to the multicopter (e.g., more specifically, to the floats for the inner rotors and to the arms for the outer rotors) in a fixed manner at the roll angles and pitch angles shown in a fixed manner. In other words, the rotors cannot change their tilt positions from the positions shown. To maneuver, each rotor is independently controllable (e.g., different amounts of torque can be applied to each rotor), such that each rotor can rotate at a different speed or output a different amount of thrust.

The various tilt positions shown here enable the multicopter to maneuver more efficiently compared to some other multicopter designs. For example, consider another multicopter where the rotors only tilt forward or backward to some degree (i.e., all of the rotors have a roll angle of 0°). To move sideways (e.g., left or right), such a multicopter may have to expend more power because none of the rotors have a non-zero roll angle which would help to move the multicopter laterally to the left or right. In contrast, the multicopter shown here can move sideways in a more efficient manner because the rotors have non-zero roll angles.

The following figure shows an example of a state machine which includes autonomous takeoff and autonomous landing.

Figure 4:
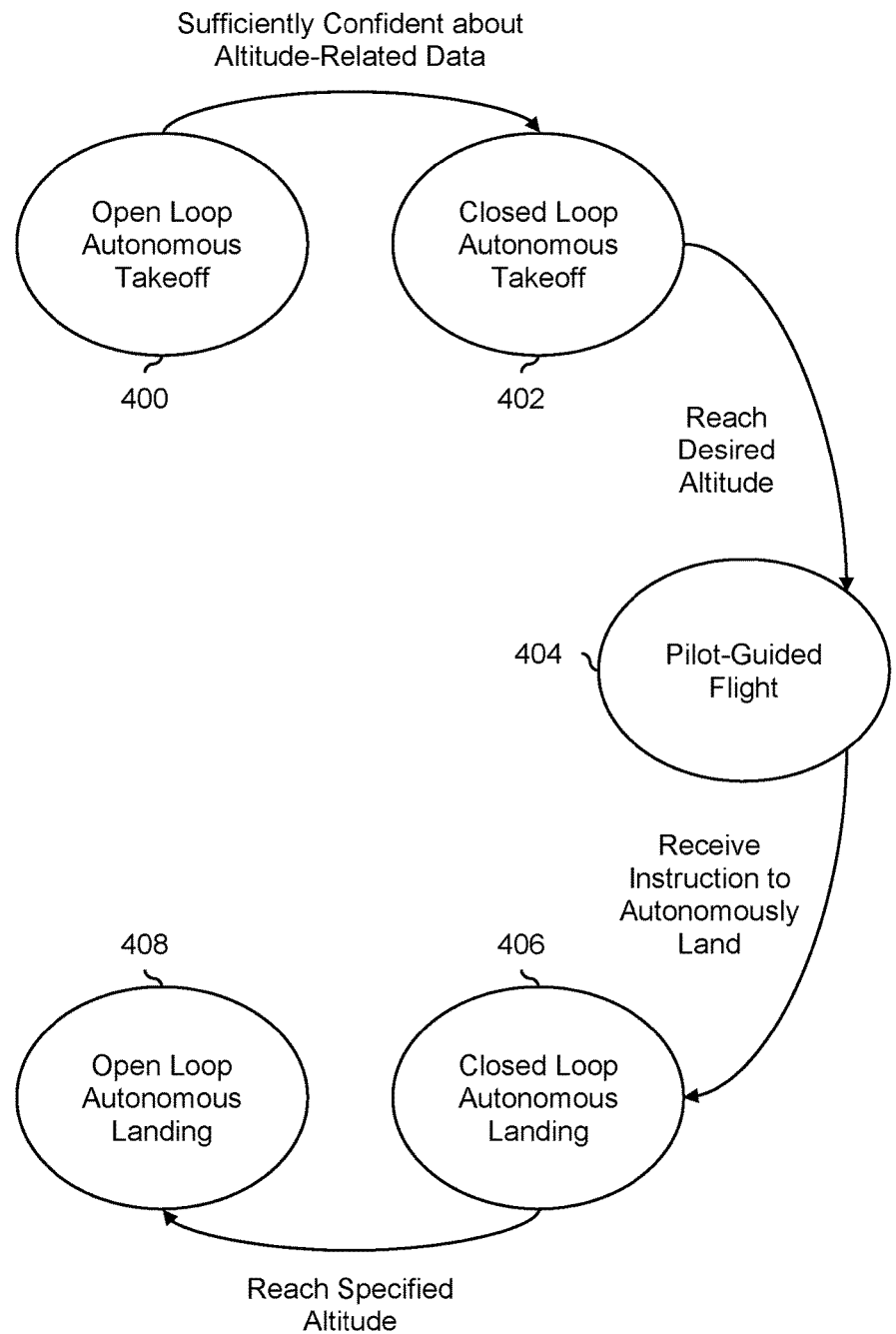
FIG. 4 is a diagram illustrating an embodiment of a state machine which begins with an autonomous takeoff and ends with an autonomous landing.

FIG. 4 is a diagram illustrating an embodiment of a state machine which begins with an autonomous takeoff and ends with an autonomous landing. In the example shown, the aircraft begins in state 400, for example after the aircraft powers up and once the pilot is ready and has initiated the autonomous takeoff procedure. In state 400, the aircraft performs open loop autonomous takeoff. For example, this corresponds to altitudes below $altitude_{OL \leftrightarrow CL}$ (304) in FIG. 4 and operating in an open loop mode at step 100 in FIG. 1.

During state 400, the system continuously assesses whether it is sufficiently confident about the altitude-relative. In various embodiments, a variety of information can be analyzed in making this determination. In some embodiments, an altitude-related sensor outputs both an altitude (or, more generally, altitude-related data) as well as a confidence metric (or, more generally, metadata) associated with the altitude. For example, the confidence metric may range from 0% (e.g., where the altitude-related sensor knows for sure that the altitude being output is erroneous) to 100% (e.g., where the altitude-related sensor knows for sure that the altitude being output is accurate). In some embodiments, when all of the sensors have confidence metrics that are greater than some confidence threshold, the sensor data may be used.

Alternatively, an altitude-related sensor may output just altitudes without any context or metadata indicating when those values are trustworthy and/or accurate. In some such embodiments, there are multiple altitude-related sensors (e.g., each of which employs a different technique to measure altitude, such as GPS, radar-based, etc.). In some embodiments, when all of the altitudes are in agreement about the altitude to within some predefined degree or tolerance, the system decides to switch from state 400 to state 402.

In state 402, the aircraft operates in a closed loop autonomous takeoff mode. For example, this corresponds to altitudes between $altitude_{OL \leftrightarrow CL}$ (304) and $altitude_{pilot \leftrightarrow auto}$ (306) in FIG. 3 and operating in a closed loop mode at step 102 in FIG. 1.

In this example, the autonomous takeoff procedure is configured to bring the aircraft to some desired altitude, at which point the aircraft will switch over from closed loop autonomous takeoff state 402 to pilot-guided flight state 404. Since the aircraft is definitely out of the dead zone, the altitude-related data may be used to determine when the desired altitude is reached.

In pilot-guided flight state 404, the aircraft will be steered or otherwise guided by the pilot. Once the pilot is ready to land, the pilot may have the aircraft hover midair at some point (e.g., over some desired landing point). The pilot may then send an instruction to the aircraft to autonomously land, for example using some button or control in a user interface.

In closed loop autonomous landing state 406, the aircraft descends autonomously where the altitude-related data is used in a feedback loop. Since this region is above the dead zone, the altitude-related data can be used. For example, this state corresponds to operating in a closed loop mode at step 102 in FIG. 1 and flying at altitudes between $altitude_{OL \leftrightarrow CL}$ (304) and $altitude_{pilot \leftrightarrow auto}$ (306) in FIG. 3.

Once a specified or predetermined altitude is reached (e.g., above the dead zone with some margin), the system switches to open loop autonomous landing state 408. In this state, the aircraft will continue to land, but in open loop mode and without using the altitude-related data. The state machine ends when the aircraft touches down on the ground and the aircraft is turned off.

For simplicity and ease of explanation, it is assumed in this example that all of the pilot-guided flight (404) occurs outside of the dead zone. In some embodiments, during pilot-guided flight state 404, checks are continuously performed to ensure that the aircraft does not descend into the dead zone. If the aircraft were in or near the dead zone when the pilot issued the instruction to autonomously land, then the state machine would transition from pilot-guided flight state 404 to open loop autonomous landing state 408, bypassing closed loop autonomous landing state 406. Alternatively, in some embodiments, the pilot is prevented from flying too low (i.e., into the dead zone).

These examples of how to detect when to switch between an open loop mode and a closed loop mode are described more generally and/or formally in the following flowcharts.

Figure 5:
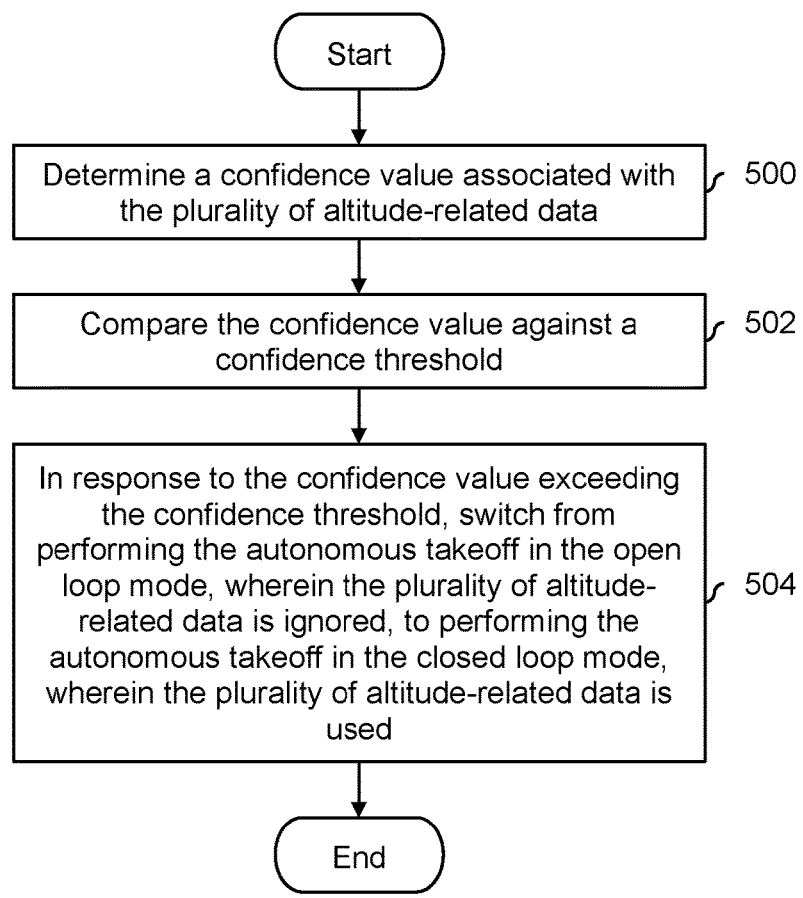
FIG. 5 is a flowchart illustrating an embodiment of a process to switch from an open loop mode to a closed loop mode during an autonomous takeoff.

FIG. 5 is a flowchart illustrating an embodiment of a process to switch from an open loop mode to a closed loop mode during an autonomous takeoff. In some embodiments, the process of FIG. 5 is performed in combination with the process of FIG. 1. In the context of FIGS. 2A and 2B, FIG. 5 corresponds to detecting when to switch from the open loop mode shown in FIG. 2A to the closed loop mode shown in FIG. 2B. In the context of FIG. 4, FIG. 5 corresponds to detecting when to switch from open loop autonomous takeoff state 400 to closed loop autonomous takeoff state 402.

At 500, a confidence value associated with the plurality of altitude-related data is determined. As described above, some altitude-related sensors output some reliability or confidence value (more generally referred to as metadata) associated with the altitude-related data itself and in some such embodiments the metadata is used to determine the confidence value (e.g., select the lowest or worst confidence value). In some embodiments, the confidence value is determined from the altitude-related data, for example by determining some deviation between the various altitude measurements.

At 502, the confidence value is compared against a confidence threshold. Naturally, the confidence threshold may be tuned or otherwise set to whatever value is desired in order to safely switch over from open loop mode to closed loop mode.

At 504, in response to the confidence value exceeding the confidence threshold, there is a switch from performing the autonomous takeoff in the open loop mode, wherein the plurality of altitude-related data is ignored, to performing the autonomous takeoff in the closed loop mode, wherein the plurality of altitude-related data is used. For example, the system would switch from the state shown in FIG. 2A (where switch 200a is open) to the state shown in FIG. 2B (where switch 200b is closed).

This process may be repeated as the aircraft ascends during an autonomous takeoff. For example, multicopter 300 in FIG. 3 may start on the ground or water. At some altitude above the dead zone (e.g., above altitude$_{deadzone}$ (302)), the altitude sensors will start to output metadata values indicating the altitudes are reliable and/or the measured altitudes will start to converge or otherwise agree with each other, and the multicopter can switch from open loop mode to closed loop mode because the altitude measurements are reliable and/or trustworthy.

Figure 6:
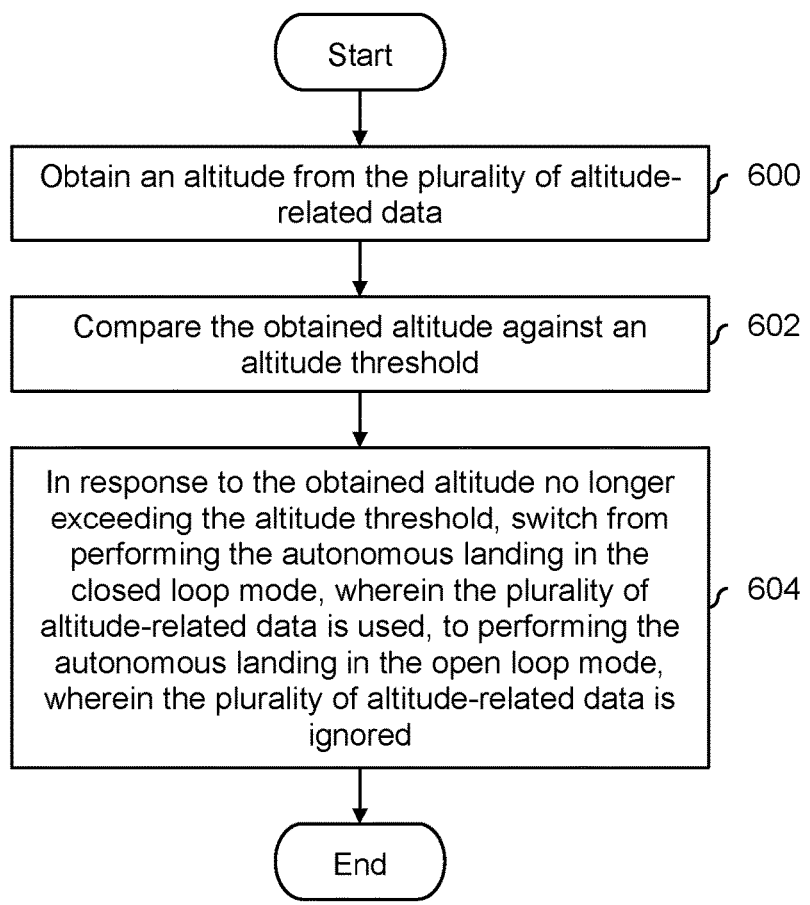
FIG. 6 is a flowchart illustrating an embodiment of a process to switch from a closed loop mode to an open loop mode during an autonomous landing.

FIG. 6 is a flowchart illustrating an embodiment of a process to switch from a closed loop mode to an open loop mode during an autonomous landing. In some embodiments, the process of FIG. 6 is performed in combination with the process of FIG. 1. In the context of FIGS. 2A and 2B, FIG. 6 corresponds to detecting when to switch from the closed loop mode shown in FIG. 2B to the open loop mode shown in FIG. 2A. In the context of FIG. 4, FIG. 6 corresponds to detecting when to switch from closed loop autonomous landing state 406 to open loop autonomous landing state 408.

At 600, an altitude is obtained from the plurality of altitude-related data. For example, if the altitude-related data comprises altitude measurements, then one of the altitudes may be selected. If the altitude-related data comprises some raw data (e.g., a phase or time delay associated with a received radar signal) from which the altitude is calculated, then the appropriate calculation and selection (e.g., of one of the calculated altitudes) is performed.

At 602, the obtained altitude is compared against an altitude threshold. See, for example FIG. 3. The altitude threshold used at step 602 may correspond to altitude$_{OL \leftrightarrow CL}$ (304) in FIG. 3 where that value is set so that there is some margin between altitude$_{OL \leftrightarrow CL}$ (304) and altitude$_{deadzone}$ (302).

At 604, in response to the obtained altitude no longer exceeding the altitude threshold, there is a switch from performing the autonomous landing in the closed loop mode, wherein the plurality of altitude-related data is used, to performing the autonomous landing in the open loop mode, wherein the plurality of altitude-related data is ignored.

This process may be repeated as the aircraft descends during an autonomous landing. For example, once multicopter 300 in FIG. 3 descends below altitude$_{OL \leftrightarrow CL}$ (304), which in this case would be a predetermined altitude, the multicopter will switch from closed loop mode to open loop mode because the multicopter is about to enter the dead zone (e.g., below altitude$_{deadzone}$ (302)) and the altitude measurements will soon be erroneous and/or untrustworthy.

In some embodiments, the ceiling of a dead zone depends upon the relevant surface beneath the aircraft. For example, a dead zone above water may have a different ceiling compared to a dead zone above solid ground. In some embodiments, the altitude threshold used at step 602 is selected based at least in part on the landing surface (e.g., land or water). For example, this may include first determining whether the aircraft is above land or water using a variety of techniques (e.g., sensor-based or location-based). Then, either a water altitude threshold or a land altitude threshold is selected accordingly.

In some embodiments where performing autonomous flight in a closed loop mode (see, e.g., step 102 in FIG. 1) includes performing an autonomous landing, this step or process includes detecting ground detection (e.g., so that the autonomous landing procedure can stop). The following figures describe some example ground detection criteria which may be used alone or in combination with other ground detection criteria.

Figure 7A:
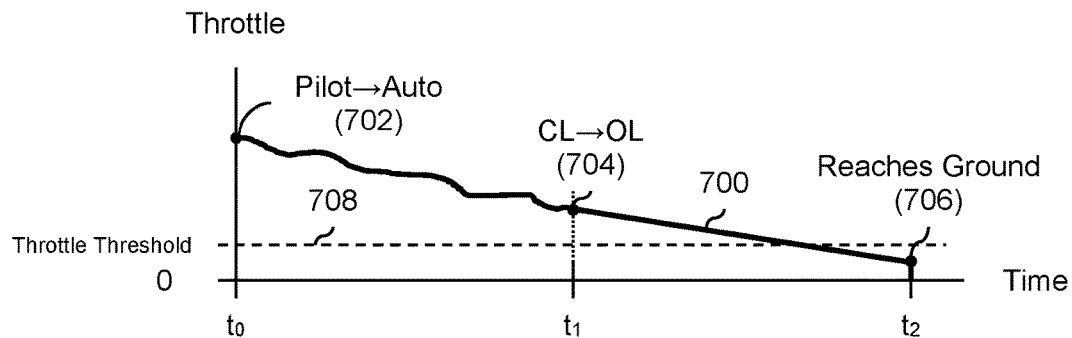
FIG. 7A is a graph illustrating an embodiment of a throttle signal during an autonomous landing.

FIG. 7A is a graph illustrating an embodiment of a throttle signal during an autonomous landing. In the example shown, throttle signal (700) shows a throttle signal which is generated by an autonomous landing process where the x-axis shows time and the y-axis shows a throttle value which is passed to a rotor. For example, throttle signal 700 may correspond to the throttle signal which is output by controller 204 in FIG. 2A and FIG. 2B.

The throttle signal (700) generally decreases over time so that the corresponding multicopter gradually descends. Data point 702 corresponds to an instruction from the pilot to begin an autonomous landing procedure. This triggers a transition from a pilot-guided state or mode to a closed loop autonomous landing mode or state. Note that throttle signal 700 is "noisy" or "wiggly" between data points 702 and 704 because this is the period during which closed loop feedback occurs and the closed feedback loop injects or otherwise introduces small adjustments or corrections.

Figure 7B:
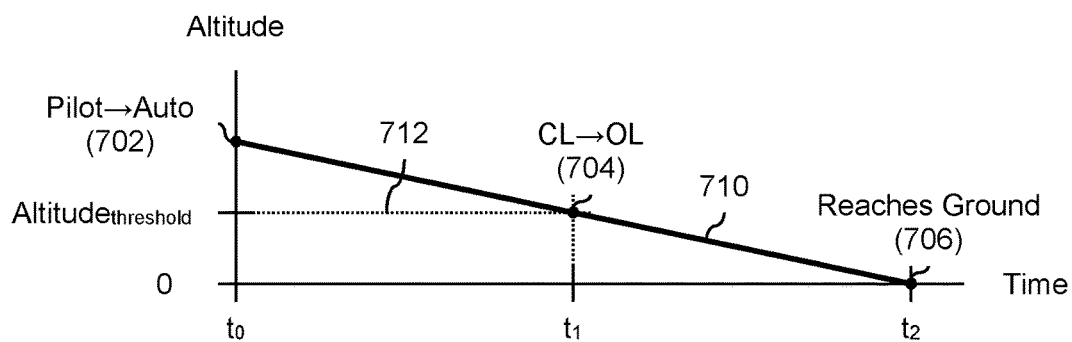
FIG. 7B is a graph illustrating an embodiment of an altitude signal of a multicopter during an autonomous landing.

FIG. 7B is a graph illustrating an embodiment of an altitude signal of a multicopter during an autonomous landing. In this example, the altitude signal (710) corresponds to throttle signal 700 from FIG. 7A and data points in common have the same reference numbers. The altitude signal shown here may be thought of as a perfect altitude coming from an omniscient sensor with no dead zone. This exemplary altitude signal (710) is used to illustrate this example, where the ground detection criterion uses a throttle threshold. In reality, the system will not have reliable altitude measurements at low altitudes and (as is described in more detail below) the exemplary ground detection techniques described herein do not rely upon altitude measurements to detect when the aircraft has reached the ground.

The altitude (710) of the multicopter gradually decreases in FIG. 7B until the multicopter is at the same altitude as an altitude threshold (712). This causes the system to switch from a closed loop autonomous landing mode to an open loop autonomous landing mode (704). Returning to FIG. 7A, note that the throttle signal is smooth after data point 704 because the system begins operating in an open loop mode after data point 704.

Returning to FIG. 7A, the throttle signal (700) keeps descending after the transition from closed loop mode to open loop mode at 704. In FIG. 7B, this decreasing throttle causes the multicopter to descend further, until the altitude reaches zero and the multicopter reaches the ground (or water) at data point 706.

Returning to FIG. 7A, it is noted that the throttle value when the multicopter reaches the ground (706) is non-zero. In some embodiments, one ground detection criteria is that the throttle value be a relatively small value, for example less than throttle threshold 708. It is noted that this ground detection criterion also works when an aircraft is landing on water.

The following figure illustrates another example of a ground detection criterion where the criterion is associated with a yaw injection.

Figure 8A:
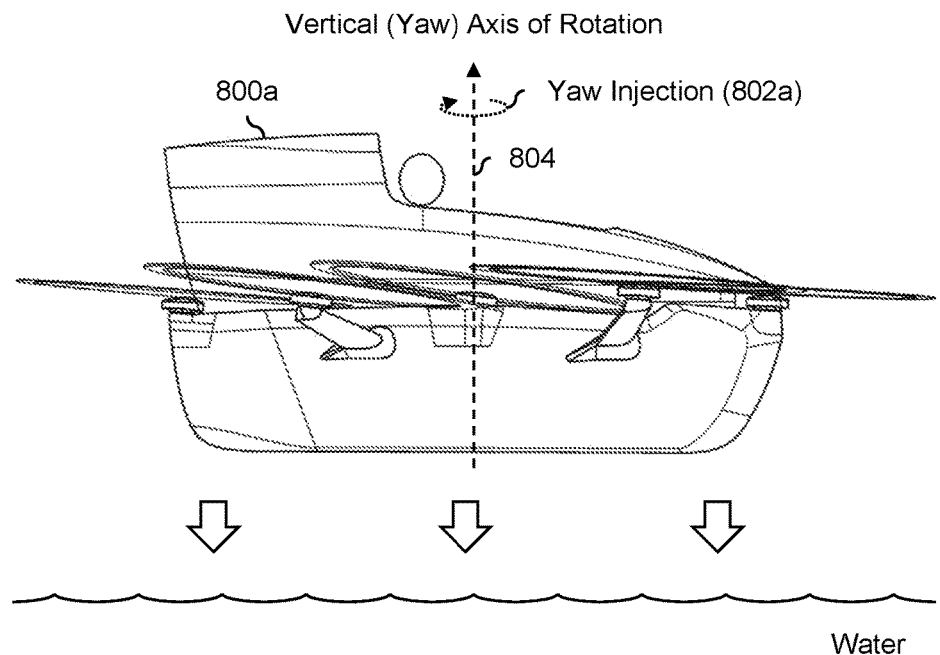
FIG. 8A is a diagram illustrating an embodiment of a yaw injection while a multicopter is above a water landing surface.

FIG. 8A is a diagram illustrating an embodiment of a yaw injection while a multicopter is above a water landing surface. In the example shown, multicopter 800a is performing an autonomous landing over water. In the state shown, multicopter 800a is still in the air and has not touched down yet. To test whether the multicopter has reached the landing surface (in this case, water) yet, the system injects a (e.g., relatively small) rotation about the vertical or yaw axis of rotation (804) which is referred to herein as a yaw injection (802a). During the autonomous landing, there is no other source for a yawing (i.e., rotation about the vertical or yaw axis), and so any yaw rotation detected during this time (e.g., using a gyroscope, accelerometer, or other sensor) can be attributed to the yaw injection. In the state shown here (i.e., where the multicopter has not yet touched down on the surface of the water), the multicopter will respond to the yaw injection and the rotation about the yaw axis will be detected.

Figure 8B:
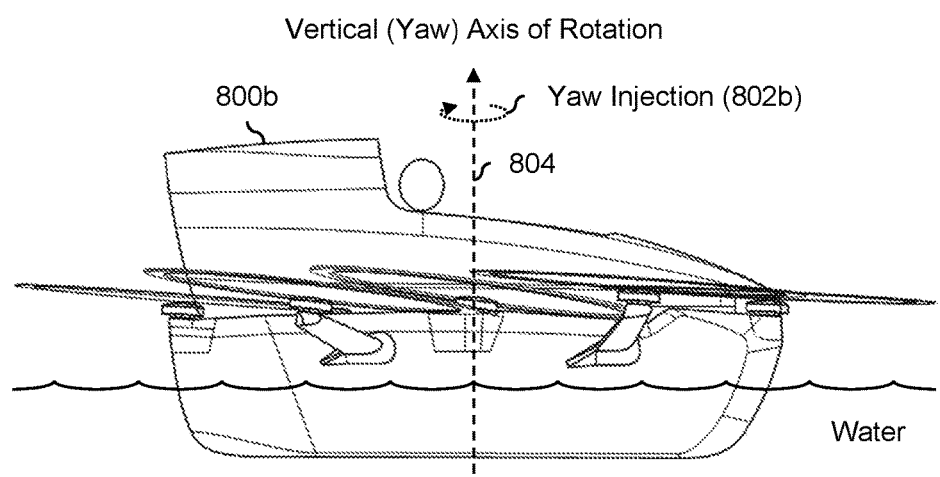
FIG. 8B is a diagram illustrating an embodiment of a yaw injection while a multicopter is floating on a water landing surface.

FIG. 8B is a diagram illustrating an embodiment of a yaw injection while a multicopter is floating on a water landing surface. In this state, the multicopter (800b) has now touched down and is floating on the surface of the water. Another yaw injection (802b) is performed in this state, but because the multicopter is floating in the water, there will be resistance to the yaw injection and there will be little or no measured rotation about the vertical or yaw axis of rotation (804).

Naturally, an injection of a rotation about some other axis (e.g., besides the yaw or vertical axis) may be used to perform ground detection (e.g., pitch injection, roll injection, etc.). The general technique is referred to herein as rotation injection. In this example (where the 10 rotor multicopter described above is used), yaw injection may be attractive because this type of multicopter has good yaw control and/or good yaw responsiveness. Naturally, other types of aircraft with different performance characteristics may use some other rotation injection technique appropriate for those types of aircraft during ground detection.

These ground detection criteria examples are described more generally and/or formally in the flowcharts below.

Figure 9:
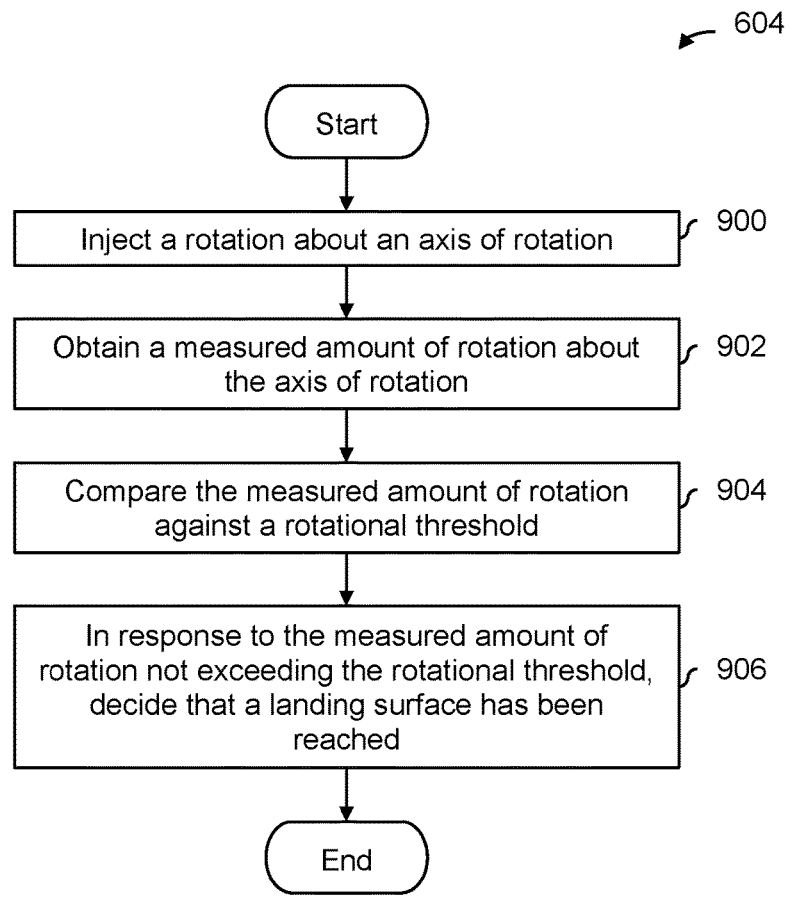
FIG. 9 is a flowchart illustrating an embodiment of a process to perform an autonomous landing in an open loop mode, including by performing ground detection using rotation injection.

FIG. 9 is a flowchart illustrating an embodiment of a process to perform an autonomous landing in an open loop mode, including by performing ground detection using rotation injection. In some embodiments, the process of FIG. 9 is used at step 604 in FIG. 6.

At 900, a rotation about an axis of rotation is injected. For example, in FIG. 8A and FIG. 8B, a 10 rotor multicopter is shown where there are 10 (e.g., independent) throttle signals (not shown) going to the 10 rotors. Appropriate values or levels may be injected or otherwise added to those throttle signals to get multicopter 800a/800b to rotate (e.g., slightly) about the vertical or yaw axis of rotation (802a/802b).

At 902, a measured amount of rotation about the axis of rotation is obtained. Appropriate sensors such as accelerometers, gyroscopes and such may be used to measure the degree or amount of rotation, if any.

At 904, the measured amount of rotation is compared against a rotational threshold. For example, as is shown in FIG. 8A, an aircraft is more responsive to rotation injection when still in the air (and therefore the measured amount of rotation is expected to be greater than the rotational threshold). When the aircraft has reached the landing surface (see FIG. 8B), the aircraft is less responsive to rotation injection and is expected to be less than the rotational threshold.

At 906, in response to the measured amount of rotation not exceeding the rotational threshold, it is decided that a landing surface has been reached. In some embodiments, this decision triggers some action (e.g., the autonomous landing procedure turns off the rotors and ends).

Figure 10:
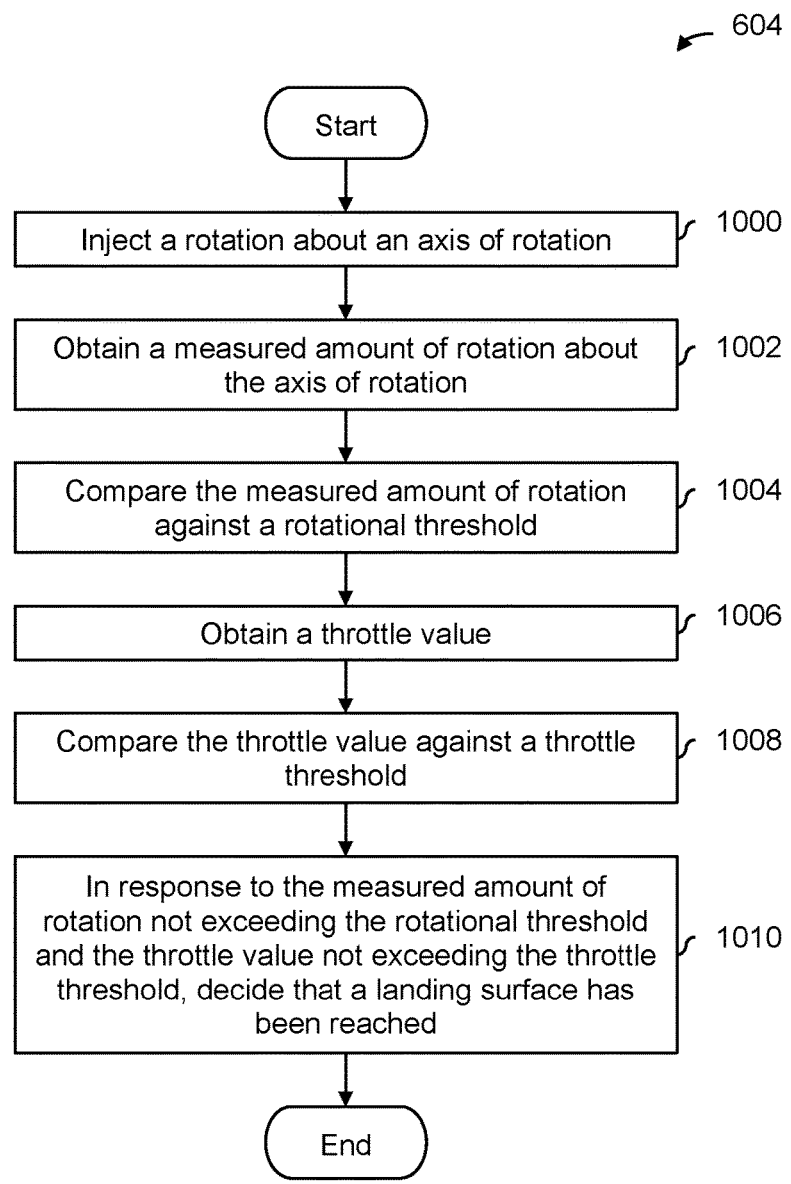
FIG. 10 is a flowchart illustrating an embodiment of a process to perform an autonomous landing in an open loop mode, including by performing ground detection using rotation injection and a throttle threshold.

FIG. 10 is a flowchart illustrating an embodiment of a process to perform an autonomous landing in an open loop mode, including by performing ground detection using rotation injection and a throttle threshold. In some embodiments, the process of FIG. 10 is used at step 604 in FIG. 6.

At 1000, a rotation about an axis of rotation is injected. At 1002, a measured amount of rotation about the axis of rotation is obtained. At 1004, the measured amount of rotation is compared against a rotational threshold.

At 1006, a throttle value is obtained. For example, if there are 10 throttle signals going to 10 rotors in a multicopter, then a representative value may be obtained by selecting one of the throttle values or combining all of the throttle values into a single throttle value (e.g., median, average, etc.).

At 1008, the throttle value is compared against a throttle threshold. See, for example, FIG. 7A. When an aircraft reaches the ground at data point 706, the throttle value is relatively low and is therefore expected to be less than the throttle threshold (708).

At 1010, in response to the measured amount of rotation not exceeding the rotational threshold and the throttle value not exceeding the throttle threshold, it is decided that a landing surface has been reached. To put it another way, the throttle must be less than the throttle threshold and the measured amount of rotation must be less than the rotational threshold in order for the process to declare that the aircraft has touched down.

It is noted that some other ground detection techniques rely upon pins or buttons on the bottom of the aircraft which are pushed in when the aircraft touches down. For the exemplary multicopter described above (which is capable of landing both on water and solid ground), this pin-based ground detection technique is not attractive because it will not work when landing on water. It is noted that the above ground detection techniques work across a variety of landing surfaces, including water.

As described above, in some embodiments, the aircraft which performs the autonomous flight technique(s) described herein is a (ultra) lightweight aircraft. When the weight of the aircraft is very light, the responsiveness of the aircraft is substantially affected by the weight of the pilot since the pilot's weight is a fairly large percentage of the total weight. The following figures describe some examples where a parameter update process and/or a parameter selection process takes a pilot's weight into account.

Figure 11A:
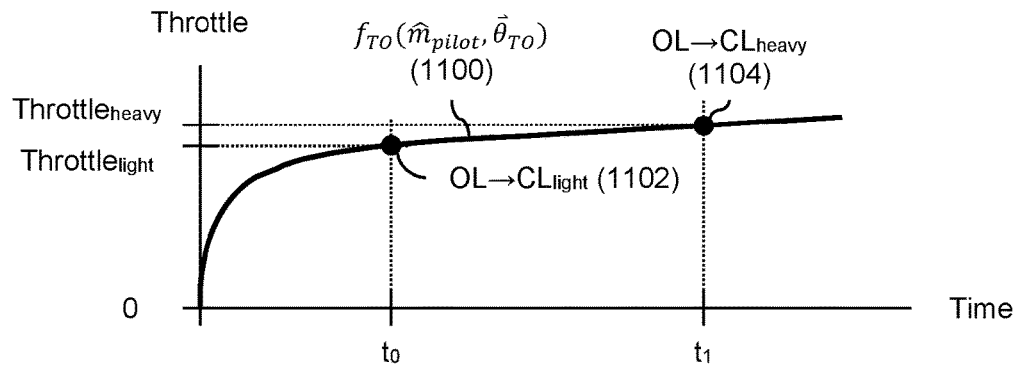
FIG. 11A is a graph illustrating an embodiment of a throttle signal associated with an autonomous takeoff.

FIG. 11A is a graph illustrating an embodiment of a throttle signal associated with an autonomous takeoff. In this example, an autonomous takeoff is being performed and as such, the throttle signal (1100) ramps up quickly (e.g., so that the pilot does not become impatient while the aircraft is still on the ground, waiting to achieve the necessary lift to leave the ground) and then increases more slowly (e.g., once the aircraft has left the ground). For simplicity and ease of explanation, the throttle signal shown here is smooth. In an actual throttle single, the throttle signal may become "noisy" or "wiggly" once the system switches over from an open loop autonomous takeoff mode to a closed loop autonomous takeoff mode (which is not reflected here). In the context of FIG. 2A and FIG. 2B, throttle signal 1100 corresponds to the throttle signal output by controller 204.

Figure 11B:
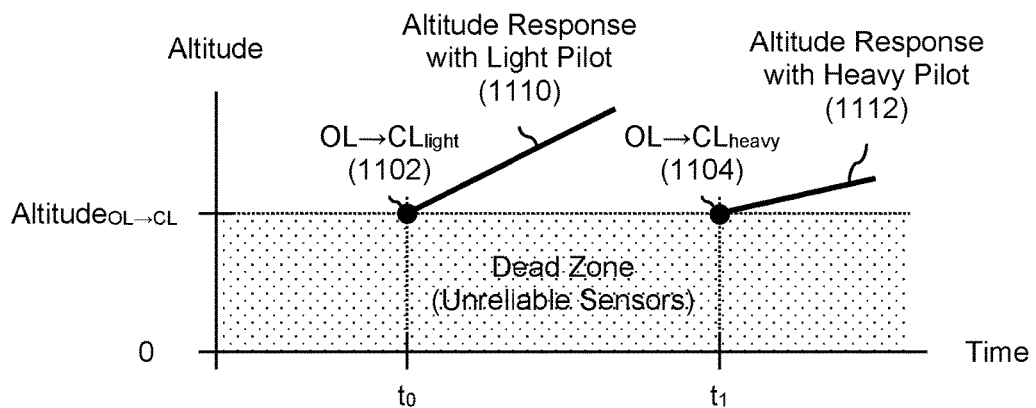
FIG. 11B is a graph illustrating an embodiment of two altitude responses associated with an autonomous takeoff.

FIG. 11B is a graph illustrating an embodiment of two altitude responses associated with an autonomous takeoff. In this example, there are two altitude responses to throttle signal 1100 shown in FIG. 11A. A first altitude response signal (1110) corresponds to an (ultra) lightweight aircraft (not shown) which is flown by a (relatively) light pilot (e.g., on the order of 100 lbs). A second altitude response signal (1112) corresponds to the same (ultra) lightweight aircraft being flown by a (relatively) heavy pilot (e.g., on the order of 200-300 lbs).

Initially, the aircraft is in the dead zone and so no altitude signal is shown below altitude$_{OL \rightarrow CL}$ when the system determines that the altitude-related data can be trusted and switches from open loop mode to closed loop mode. At data point 1102, the aircraft with the light pilot reaches altitude$_{OL \rightarrow CL}$ and reliable altitude measurements are available. This data point (i.e., 1102) occurs at time $t_0$. Due to the lighter weight of this pilot, the aircraft will be able to ascend more quickly than when the heavier pilot is flying the aircraft (e.g., given the same throttle signal and same aircraft).

At a second, later point in time (i.e., $t_1$), the aircraft with the heavy pilot reaches an altitude of altitude$_{OL \rightarrow CL}$. For simplicity and ease of explanation, the same altitude$_{OL \rightarrow CL}$ is shown for both the light pilot and the heavy pilot. This second altitude response is shown as line 1112 and it is noted that the slope of the altitude response with the lighter pilot (1110) is steeper than the slope of the altitude response with the heavier pilot (1112).

In FIG. 11A, data points 1102 and 1104 correspond to different throttle values. For the heavy pilot, a throttle value of throttle$_{heavy}$ is associated with the point at which the system switches from open loop mode to closed loop mode, which is greater than the throttle value at which the light pilot's system similarly switched from open loop mode to closed loop mode (i.e., throttle$_{light}$). The inequality of throttle$_{heavy}$>throttle$_{light}$ is due to the larger throttle value to get the aircraft with the heavy pilot to an altitude of altitude$_{OL \rightarrow CL}$ (i.e., when the system switches from open loop mode to closed loop mode).

As shown here, with a (ultra) lightweight aircraft, the weight of the pilot is a relatively large percentage of the total weight and so the pilot's weight affects the aircraft's responsiveness to a noticeable and/or measurable degree. In some embodiments, various properties or characteristics of a throttle signal (e.g., 1100 in FIG. 11A) or an altitude response (e.g., 1110 or 1112 in FIG. 11B) associated with an autonomous takeoff (or, alternatively, landing) are analyzed in order to get an estimate or measurement of a pilot's weight. More specifically, in some embodiments this includes analyzing the slope of an altitude response (see, e.g., the slopes of altitude responses 1110 and 1112 in FIG. 11B), the time at which the system switches over from an open loop autonomous takeoff mode to a closed loop autonomous takeoff mode (e.g., $t_0$ versus $t_1$ in FIG. 11A and FIG. 11B), and/or the throttle values at which the system switches over from an open loop autonomous takeoff mode to a closed loop autonomous takeoff mode (e.g., throttle$_{heavy}$ versus throttle$_{light}$ in FIG. 11A).

In some embodiments, a qualitative estimate of a pilot's weight is determined, as opposed to a quantitative estimate. For example, there could be a classification scheme where each pilot is classified as light, medium, or heavy. Alternatively, in some embodiments a quantitative estimate of a pilot's weight is determined.

The pilot's estimated weight or mass (referred to herein as $\hat{m}_{pilot}$) may be used in a variety of ways. In some embodiments, the pilot's estimated weight is used during one or more of the following states in FIG. 4: pilot-guided flight state 404 (e.g., because the system generates supplemental signal(s) which are combined with the pilot's guidance or instructions and better quality supplemental signal(s) can be generated with an estimate of the pilot's weight), closed loop autonomous landing state 406 (e.g., because more throttle is required to land an aircraft with a heavier pilot), and/or open loop autonomous landing state 408 (e.g., because more throttle is required to land an aircraft with a heavier pilot).

In addition to using the pilot's estimated weight in the manner above, the pilot's estimated weight may be used during training to update parameters associated with the autonomous takeoff (i.e., $\vec{\theta}_{TO}$). For example, FIG. 11A shows that the throttle values are generated using the function $f_{TO}$ which is a function of two inputs: the pilot's weight (i.e., $\hat{m}_{pilot}$), which is estimated, and the autonomous takeoff parameters (i.e., $\vec{\theta}_{TO}$), which are learned. When updating the autonomous takeoff parameters ($\vec{\theta}_{TO}$) during some update or learning process, the estimated weight of the pilot is taken into account, for example by putting the observed response or behavior of the aircraft into context with respect to the pilot's weight. This creates a better set of parameters than if the parameters were updated without any consideration towards or context about the pilot's weight. For example, without the contextual knowledge that altitude response 1110 is for a light pilot, the system may think that the aircraft is taking off too quickly and may unnecessarily adjust the autonomous takeoff parameters so that the autonomous takeoff slows down. Pilots with moderate weight may find these updated parameters annoying because the takeoff is too slow. Conversely, without the contextual knowledge that altitude response 1112 is for a heavy pilot, the system may unnecessarily adjust the autonomous takeoff parameters so that the autonomous takeoff speeds up.

Although not shown here, there may be a similar throttle function associated with generating throttle values for an autonomous landing: throttle=$f_L(\hat{m}_{pilot}, \vec{\theta}_L)$. The autonomous landing parameters (i.e., $\vec{\theta}_L$) may similarly be updated while taking the pilot's estimated weight (i.e., $\hat{m}_{pilot}$) into account. Also, since it is assumed that the pilot will not change between takeoff and landing, the pilot's weight (e.g., estimated during takeoff) may be used during landing (e.g., to generate throttle values for autonomous landing that are appropriate for a pilot of that weight). In some embodiments, the parameters $\vec{\theta}_L$ and $\vec{\theta}_{TO}$ have known relationships and the parameters $\vec{\theta}_L$ can be updated using the $\vec{\theta}_{TO}$ parameters, or vice versa so that only one training process is performed. Alternatively, there may be a separate takeoff training process and landing training process (e.g., if $\vec{\theta}_L$ and $\vec{\theta}_{TO}$ are independent of each other).

These examples are described more generally and/or formally in flowcharts below.

Figure 12:
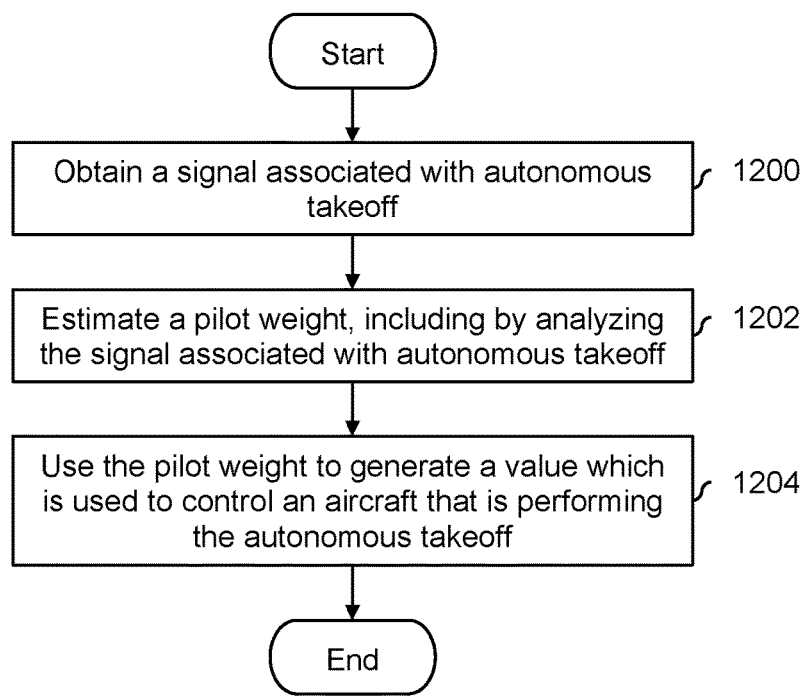
FIG. 12 is a flowchart illustrating an embodiment of a process to estimate a pilot's weight during autonomous takeoff.

FIG. 12 is a flowchart illustrating an embodiment of a process to estimate a pilot's weight during autonomous takeoff. In some embodiments, the process is performed in combination with the process of FIG. 1. Although it is possible to estimate a pilot's weight during an autonomous landing (as opposed to estimating the weight during takeoff), as a practical matter it may make more sense to perform the weight estimation during takeoff, since takeoff occurs at the beginning of a flight and the estimated weight can be used for the duration of the flight.

At 1200, a signal associated with autonomous takeoff is obtained. For example, throttle signal 1100 in FIG. 11A, altitude response 1110 in FIG. 11B, or altitude response 1112 in FIG. 11B may be obtained.

At 1202, a pilot weight is estimated, including by analyzing the signal associated with autonomous takeoff. For example, as shown in FIG. 11A and FIG. 11B, in some embodiments this includes analyzing one or more of the following properties associated with the signal: a time associated with switching from performing the autonomous takeoff in the open loop mode to performing the autonomous takeoff in the closed loop mode, a throttle associated with switching from performing the autonomous takeoff in the open loop mode to performing the autonomous takeoff in the closed loop mode, or a slope of the signal. In some embodiments, the estimated weight is qualitative, such as a classification or categorization such as light, medium, or heavy.

At 1204, the pilot weight is used to generate a value which is used to control an aircraft that is performing the autonomous takeoff. For example, during pilot-guided flight state 404 in FIG. 4, the pilot weight may be used to generate some supplemental signal (e.g., associated with making the flight experience safer, easier, and/or more intuitive) which is combined with some signal from the pilot. Or, the pilot weight may be used during closed loop autonomous landing state 406 and/or open loop autonomous landing state 408 in FIG. 4 to generate throttle values for the autonomous landing (e.g., throttle=$f_L(\hat{m}_{pilot}, \vec{\theta}_L)$).

Figure 13:
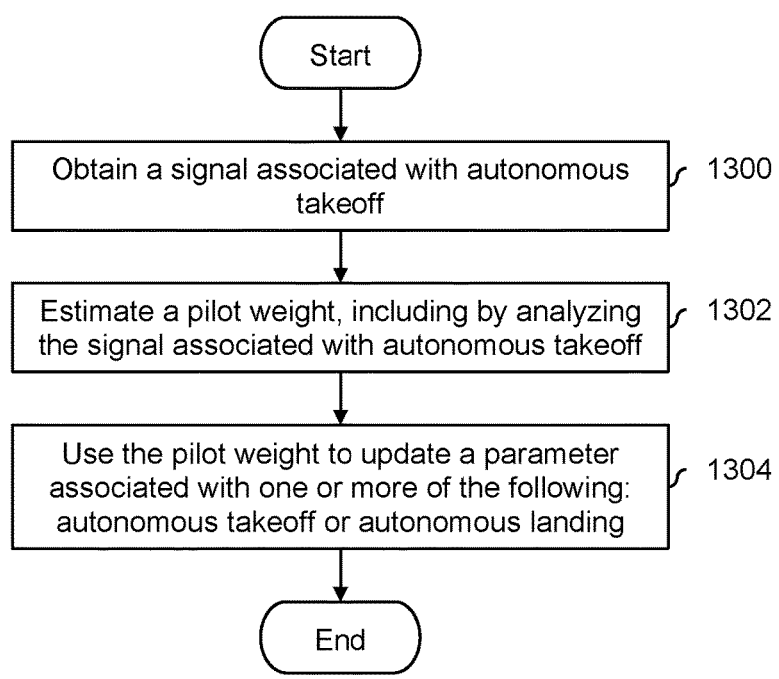
FIG. 13 is a flowchart illustrating an embodiment of a process to estimate a pilot's weight during autonomous takeoff and update a parameter using the pilot's estimated weight.

FIG. 13 is a flowchart illustrating an embodiment of a process to estimate a pilot's weight during autonomous takeoff and update a parameter using the pilot's estimated weight. In some embodiments, the process is performed in combination with the process of FIG. 1.

At 1300, a signal associated with autonomous takeoff is obtained. See, for example, the signals shown in FIG. 11A and FIG. 11B.

At 1302, a pilot weight is estimated, including by analyzing the signal associated with autonomous takeoff. For example, in FIG. 11A and FIG. 11B, the times $t_0$ or $t_1$ may be analyzed, the throttle values throttle$_{heavy}$ or throttle$_{light}$ may be analyzed, and/or the slopes of altitude responses 1110 or 1112 may be analyzed.

At 1304, the pilot weight is used to update a parameter associated with one or more of the following: autonomous takeoff or autonomous landing. In one simplistic example, there are different sets of parameters associated with different weight categories. For example, the takeoff parameters may include $\vec{\theta}_{TO,light}$, $\vec{\theta}_{TO,medium}$, and $\vec{\theta}_{TO,heavy}$ and the landing parameters may include $\vec{\theta}_{L,light}$, $\vec{\theta}_{L,medium}$, and $\vec{\theta}_{L,heavy}$. Depending upon the classified weight (e.g., light, medium, or heavy), the appropriate set of parameters is selected and updated, leaving the unselected parameters untouched (at least during this iteration of training and/or updating with this particular pilot). In other words, updating the parameter includes using the pilot weight to select the parameter from a plurality of parameters associated with different pilot weights.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   perform autonomous flight in an open loop mode over a first range of altitudes, wherein a plurality of altitude-related data from a plurality of altitude-related sensors is not used for determining instructions for performing autonomous flight while performing the autonomous flight in the open loop mode;
   determine instructions for performing autonomous landing in the open loop mode including instructions for performing ground detection including by:
   injecting a rotation about an axis of rotation;
   obtaining a measured amount of rotation about the axis of rotation;
   comparing the measured amount of rotation against a rotational threshold; and
   in response to the measured amount of rotation not exceeding the rotational threshold, deciding that a landing surface has been reached; and
   perform the autonomous flight in a closed loop mode over a second range of altitudes, wherein: the plurality of altitude-related data from the plurality of altitude-related sensors is used while performing the autonomous flight in the closed loop mode, and the first range of altitudes is a non-overlapping, lower range of altitudes compared to the second range of altitudes.

2. The system recited in claim 1, wherein:
   the autonomous flight includes autonomous takeoff; and
   the memory is further configured to provide the processor with instructions which when executed cause the processor to:
   determine a confidence value;
   compare the confidence value against a confidence threshold; and
   in response to the confidence value exceeding the confidence threshold, switch from performing the autonomous takeoff in the open loop mode, wherein the plurality of altitude-related data is ignored, to performing the autonomous takeoff in the closed loop mode, wherein the plurality of altitude-related data is used.

3. The system recited in claim 1, wherein:
the memory is further configured to provide the processor with instructions which when executed cause the processor to:
  obtain an altitude from the plurality of altitude-related data;
  compare the obtained altitude against an altitude threshold; and
  in response to the obtained altitude no longer exceeding the altitude threshold, switch from performing the autonomous landing in the closed loop mode, wherein the plurality of altitude-related data is used, to performing the autonomous landing in the open loop mode, wherein the plurality of altitude-related data is ignored.

4. The system recited in claim 1, wherein:
the memory is further configured to provide the processor with instructions which when executed cause the processor to:
  obtain an altitude from the plurality of altitude-related data;
  compare the obtained altitude against an altitude threshold; and
  in response to the obtained altitude no longer exceeding the altitude threshold, switch from performing the autonomous landing in the closed loop mode, wherein the plurality of altitude-related data is used, to performing the autonomous landing in the open loop mode, wherein the plurality of altitude-related data is ignored, wherein the altitude threshold is selected based at least in part on a landing surface, including by:
    determining whether an aircraft is above land or water; and
    in response to the determination whether the aircraft is above land or water, selecting a land altitude threshold or a water altitude threshold accordingly.

5. The system recited in claim 1, wherein:
the determination of instructions for performing the autonomous landing in the open loop mode including instructions for performing ground detection further includes
  obtaining a throttle value;
  comparing the throttle value against a throttle threshold; and
  in response to the measured amount of rotation not exceeding the rotational threshold and the throttle value not exceeding the throttle threshold, deciding that a landing surface has been reached.

6. The system recited in claim 1, wherein:
the autonomous flight includes autonomous takeoff; and
the memory is further configured to provide the processor with instructions which when executed cause the processor to:
  obtain a signal associated with the autonomous takeoff;
  estimate a pilot weight, including by analyzing the signal associated with the autonomous takeoff; and
  use the pilot weight to generate a value which is used to control an aircraft that is performing the autonomous takeoff.

7. The system recited in claim 1, wherein:
the autonomous flight includes autonomous takeoff; and
the memory is further configured to provide the processor with instructions which when executed cause the processor to:
  obtain a signal associated with the autonomous takeoff;
  estimate a pilot weight, including by analyzing one or more of the following properties associated with the signal:
    a time associated with switching from performing the autonomous takeoff in the open loop mode to performing the autonomous takeoff in the closed loop mode;
    a throttle associated with switching from performing the autonomous takeoff in the open loop mode to performing the autonomous takeoff in the closed loop mode; or
    a slope of the signal; and
  use the pilot weight to generate a value which is used to control an aircraft that is performing the autonomous takeoff.

8. The system recited in claim 1, wherein:
the autonomous flight includes autonomous takeoff; and
the memory is further configured to provide the processor with instructions which when executed cause the processor to:
  obtain a signal associated with the autonomous takeoff;
  estimate a pilot weight, including by analyzing the signal associated with the autonomous takeoff; and
  use the pilot weight to update a parameter associated with one or more of the following: the autonomous takeoff or the autonomous landing.

9. The system recited in claim 1, wherein:
the autonomous flight includes autonomous takeoff; and
the memory is further configured to provide the processor with instructions which when executed cause the processor to:
  obtain a signal associated with the autonomous takeoff;
  estimate a pilot weight, including by analyzing one or more of the following properties associated with the signal:
    a time associated with switching from performing the autonomous takeoff in the open loop mode to performing the autonomous takeoff in the closed loop mode;
    a throttle associated with switching from performing the autonomous takeoff in the open loop mode to performing the autonomous takeoff in the closed loop mode; or
    a slope of the signal; and
  use the pilot weight to update a parameter associated with one or more of the following: the autonomous takeoff or the autonomous landing.

10. The system recited in claim 1, wherein:
the autonomous flight includes autonomous takeoff; and
the memory is further configured to provide the processor with instructions which when executed cause the processor to:
  obtain a signal associated with the autonomous takeoff;
  estimate a pilot weight, including by analyzing the signal associated with the autonomous takeoff; and
  use the pilot weight to update a parameter associated with one or more of the following: the autonomous takeoff or the autonomous landing, wherein updating the parameter includes using the pilot weight to select the parameter from a plurality of parameters associated with different pilot weights.

11. A method, comprising:
using a processor to perform autonomous flight in an open loop mode over a first range of altitudes, wherein a plurality of altitude-related data from a plurality of altitude-related sensors is not used for determining instructions for performing autonomous flight while performing the autonomous flight in the open loop mode;
using the processor to perform autonomous landing in the open loop mode including performing ground detection including by:
injecting a rotation about an axis of rotation;
obtaining a measured amount of rotation about the axis of rotation;
comparing the measured amount of rotation against a rotational threshold; and
in response to the measured amount of rotation not exceeding the rotational threshold, deciding that a landing surface has been reached; and
using the processor to perform the autonomous flight in a closed loop mode over a second range of altitudes, wherein: the plurality of altitude-related data from the plurality of altitude-related sensors is used while performing the autonomous flight in the closed loop mode, and the first range of altitudes is a non-overlapping, lower range of altitudes compared to the second range of altitudes.

12. The method recited in claim 11, wherein:
the autonomous flight includes autonomous takeoff; and
the method further includes:
determining a confidence value;
comparing the confidence value against a confidence threshold; and
in response to the confidence value exceeding the confidence threshold, switching from performing the autonomous takeoff in the open loop mode, wherein the plurality of altitude-related data is ignored, to performing the autonomous takeoff in the closed loop mode, wherein the plurality of altitude-related data is used.

13. The method recited in claim 11, wherein:
the method further includes:
obtaining an altitude from the plurality of altitude-related data;
comparing the obtained altitude against an altitude threshold; and
in response to the obtained altitude no longer exceeding the altitude threshold, switching from performing the autonomous landing in the closed loop mode, wherein the plurality of altitude-related data is used, to performing the autonomous landing in the open loop mode, wherein the plurality of altitude-related data is ignored.

14. The method recited in claim 11, wherein:
the method further includes:
obtaining an altitude from the plurality of altitude-related data;
comparing the obtained altitude against an altitude threshold; and
in response to the obtained altitude no longer exceeding the altitude threshold, switching from performing the autonomous landing in the closed loop mode, wherein the plurality of altitude-related data is used, to performing the autonomous landing in the open loop mode, wherein the plurality of altitude-related data is ignored, wherein the altitude threshold is selected based at least in part on a landing surface, including by:
determining whether an aircraft is above land or water; and
in response to the determination whether the aircraft is above land or water, selecting a land altitude threshold or a water altitude threshold accordingly.

15. The method recited in claim 11, wherein:
the using the processor to perform the autonomous landing in the open loop mode including by performing ground detection further includes
obtaining a throttle value;
comparing the throttle value against a throttle threshold; and
in response to the measured amount of rotation not exceeding the rotational threshold and the throttle value not exceeding the throttle threshold, deciding that a landing surface has been reached.

16. The method recited in claim 11, wherein:
the autonomous flight includes autonomous takeoff; and
the method further includes:
obtaining a signal associated with the autonomous takeoff;
estimating a pilot weight, including by analyzing the signal associated with the autonomous takeoff; and
using the pilot weight to generate a value which is used to control an aircraft that is performing the autonomous takeoff.

17. The method recited in claim 11, wherein:
the autonomous flight includes autonomous takeoff; and
the method further includes:
obtaining a signal associated with the autonomous takeoff;
estimating a pilot weight, including by analyzing one or more of the following properties associated with the signal:
a time associated with switching from performing the autonomous takeoff in the open loop mode to performing the autonomous takeoff in the closed loop mode;
a throttle associated with switching from performing the autonomous takeoff in the open loop mode to performing the autonomous takeoff in the closed loop mode; or
a slope of the signal; and
using the pilot weight to generate a value which is used to control an aircraft that is performing the autonomous takeoff.

18. The method recited in claim 11, wherein:
the autonomous flight includes autonomous takeoff; and
the method further includes:
obtaining a signal associated with the autonomous takeoff;
estimating a pilot weight, including by analyzing the signal associated with the autonomous takeoff; and
using the pilot weight to update a parameter associated with one or more of the following: the autonomous takeoff or the autonomous landing.

19. The method recited in claim 11, wherein:
the autonomous flight includes autonomous takeoff; and
the method further includes:
obtaining a signal associated with the autonomous takeoff;
estimating a pilot weight, including by analyzing one or more of the following properties associated with the signal:
a time associated with switching from performing the autonomous takeoff in the open loop mode to performing the autonomous takeoff in the closed loop mode;

a throttle associated with switching from performing the autonomous takeoff in the open loop mode to performing the autonomous takeoff in the closed loop mode; or a slope of the signal; and using the pilot weight to update a parameter associated with one or more of the following: the autonomous takeoff or the autonomous landing.

20. The method recited in claim 11, wherein:
the autonomous flight includes autonomous takeoff; and
the method further includes:
   obtaining a signal associated with the autonomous takeoff;
   estimating a pilot weight, including by analyzing the signal associated with the autonomous takeoff; and
   using the pilot weight to update a parameter associated with one or more of the following: the autonomous takeoff or the autonomous landing, wherein updating the parameter includes using the pilot weight to select the parameter from a plurality of parameters associated with different pilot weights.

21. A computer program product, the computer program product being embodied in a non-transitory computer readable storage medium and comprising computer instructions for:

performing autonomous flight in an open loop mode over a first range of altitudes, wherein a plurality of altitude-related data from a plurality of altitude-related sensors is not used for determining instructions for performing autonomous flight while performing the autonomous flight in the open loop mode;

performing autonomous landing in the open loop mode including performing ground detection including by:
   injecting a rotation about an axis of rotation;
   obtaining a measured amount of rotation about the axis of rotation;
   comparing the measured amount of rotation against a rotational threshold; and
   in response to the measured amount of rotation not exceeding the rotational threshold, deciding that a landing surface has been reached; and performing the autonomous flight in a closed loop mode over a second range of altitudes, wherein: the plurality of altitude-related data from the plurality of altitude-related sensors is used while performing the autonomous flight in the closed loop mode, and the first range of altitudes is a non-overlapping, lower range of altitudes compared to the second range of altitudes.

* * * * *